(12) United States Patent
Huang (10) Patent No.: US 10,389,224 B2
(45) Date of Patent: Aug. 20, 2019

(54) POWER CONVERTER SYSTEM AND METHOD OF OPERATING THEREOF

(71) Applicant: SAMSUNG DISPLAY CO., LTD., Yongin, Gyeonggi-Do (KR)

(72) Inventor: Chaofeng Huang, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 823 days.

(21) Appl. No.: 14/534,109

(22) Filed: Nov. 5, 2014

(65) Prior Publication Data

US 2015/0188408 A1    Jul. 2, 2015

Related U.S. Application Data

(60) Provisional application No. 61/922,624, filed on Dec. 31, 2013.

(51) Int. Cl.
*H02M 1/088* (2006.01)
*H02M 3/158* (2006.01)
(Continued)

(52) U.S. Cl.
CPC ........... *H02M 1/088* (2013.01); *H02M 3/156* (2013.01); *H02M 3/1584* (2013.01); *G05F 1/56* (2013.01);
(Continued)

(58) Field of Classification Search
CPC ......... H02M 2001/0003; H02M 3/156; H02M 3/157; H02M 2003/1586;
(Continued)

(56) References Cited

U.S. PATENT DOCUMENTS 7,545,131 B1 * 6/2009 Alexander ............ H02M 3/156
323/275
7,688,047 B2 * 3/2010 Sugiyama ............... H02M 1/36
323/268

(Continued)

FOREIGN PATENT DOCUMENTS

CN         1207603 A      2/1999
CN         100424974 C    10/2008
(Continued)

OTHER PUBLICATIONS

EPO Search Report dated Aug. 17, 2015, for corresponding European Patent application 14200389.6, (5 pages).
(Continued)

*Primary Examiner* — Adolf D Berhane
*Assistant Examiner* — Shahzeb K Ahmad
(74) *Attorney, Agent, or Firm* — Lewis Roca Rothgerber Christie LLP (57) ABSTRACT

A power converter including: a regulator including an output terminal to output an output voltage according to a first reference voltage, the output terminal to be coupled to a load; and a controller coupled to the output terminal, the controller to increase a current at the output terminal when a voltage at the output terminal is lower than a second reference voltage, and to decrease the current at the output terminal when the voltage at the output terminal is greater than a third reference voltage.

21 Claims, 5 Drawing Sheets

(51) Int. Cl.
  *H02M 3/156* (2006.01)
  *G05F 1/56* (2006.01)
  *H02M 1/00* (2006.01)

(52) U.S. Cl.
  CPC ............... *H02M 2001/0045* (2013.01); *H02M 2003/1566* (2013.01)

(58) Field of Classification Search
  CPC . H02M 2001/0009; H02M 2001/0045; H02M 2001/007; H02M 2001/0074; H02M 2001/0077; H02M 2001/008; H02M 3/158; H02M 3/1584; H02M 1/088
  See application file for complete search history.

(56) References Cited

U.S. PATENT DOCUMENTS

| | | | |
|---|---|---|---|
| 7,714,562 B2 | 5/2010 | Oswald et al. | |
| 9,213,346 B2* | 12/2015 | Shiraishi | ................... G05F 1/46 |
| 2004/0105198 A1* | 6/2004 | Fujii | ..................... H02J 7/0065 361/18 |
| 2006/0262579 A1* | 11/2006 | Chou | .................. H02M 3/1582 363/63 |
| 2013/0015827 A1* | 1/2013 | Shi | ........................ H02J 7/0068 323/266 |
| 2013/0214751 A1 | 8/2013 | Shiraishi et al. | |

FOREIGN PATENT DOCUMENTS

| | | |
|---|---|---|
| CN | 102882240 A | 1/2013 |
| JP | 2012-029186 A | 2/2012 |
| KR | 10-2008-0039874 A | 5/2008 |
| KR | 10-2010-0078155 A | 7/2010 |
| WO | WO 2005/055405 A1 | 6/2005 |

OTHER PUBLICATIONS

Chinese Office Action for corresponding Chinese Patent Application No. 201410853410.0, dated May 31, 2019, 9 pages.

* cited by examiner

POWER CONVERTER SYSTEM AND METHOD OF OPERATING THEREOF

CROSS-REFERENCE TO RELATED APPLICATION

This utility patent application claims priority to and the benefit of U.S. Provisional Patent Application Ser. No. 61/922,624; filed Dec. 31, 2013, entitled "A Hybrid DC-DC Converter," the entire content of which is incorporated herein by reference.

BACKGROUND

Low-dropout regulators (LDOs) have been utilized in electronic devices where on-chip DC-DC conversion or on-chip voltage regulation is desired. These electronic devices include, for example, cellular phones, personal digital assistants (PDAs), laptop computers, tablet computers, etc. LDOs achieve desirable line and load regulation at limited load changes (e.g., when a chip maintains a stand-by or sleep mode), but may exhibit poor response speeds at fast load changes (e.g., when a chip enters or exits from the stand-by or sleep mode).

The above information disclosed in this Background section is only for enhancement of understanding of the background of the invention and therefore it may contain information that does not form the prior art that is already known to a person of ordinary skill in the art.

SUMMARY

Aspects of embodiments of the present invention relate to a power converter that can provide desired line and load regulation when there are limited load changes, and has fast response speeds when there are sudden load changes.

Other aspects of embodiments of the present invention relate to a method of operating the power converter.

According to some embodiments of the present invention, a power converter includes: a regulator comprising an output terminal to output an output voltage according to a first reference voltage, the output terminal to be coupled to a load; and a controller coupled to the output terminal, the controller to increase a current at the output terminal when a voltage at the output terminal is lower than a second reference voltage, and to decrease the current at the output terminal when the voltage at the output terminal is greater than a third reference voltage.

The controller may include: a first transistor to increase the current at the output terminal when the first transistor is turned on; a plurality of first comparators to control the first transistor according to the second reference voltage; a second transistor to decrease the current at the output terminal when the second transistor is turned on; and a plurality of second comparators to control the second transistor according to the third reference voltage.

The plurality of first comparators may include a first comparator to turn on the first transistor and a second comparator to turn off the first transistor, and the plurality of second comparators may include a third comparator to turn on the second transistor and a fourth comparator to turn off the second transistor.

The first transistor may include a plurality of first transistors coupled in parallel to each other between a first power source and the output terminal; and the second transistor may include a plurality of second transistors coupled in parallel to each other between the output terminal and a second power source.

The plurality of the first transistors may be turned on or off sequentially, and the plurality of the second transistors may be turned on or off sequentially.

The second reference voltage may include a second on reference voltage and a second off reference voltage; the third reference voltage may include a third on reference voltage and a third off reference voltage; the first transistor may be turned on when the voltage at the output terminal is less than the second on reference voltage; the first transistor may be turned off when the voltage at the output terminal is greater than the second off reference voltage; the second transistor may be turned on when the voltage at the output terminal is greater than the third on reference voltage; and the second transistor may be turned off when the voltage at the output terminal is less than the third off reference voltage.

The first reference voltage may be between the second off reference voltage and the third off reference voltage, the second on reference voltage may be less than the first reference voltage, the second off reference voltage may be greater than the second on reference voltage, the third on reference voltage may be greater than the first reference voltage, and the third off reference voltage may be less than the third on reference voltage.

According to some embodiments of the present invention, a power converter includes: a regulator to output an output voltage to a node; a first transistor coupled between the node and a first power source, the first transistor to increase or decrease a current at the node when the first transistor is turned on; a first comparator including an input terminal coupled to the node and an output terminal coupled to a gate electrode of the first transistor, the first comparator to turn on the first transistor in response to comparing the voltage at the node with a first reference voltage; and a second comparator including an input terminal coupled to the node and an output terminal coupled to the gate electrode of the first transistor, the second comparator to turn off the first transistor in response to comparing the voltage at the node with a second reference voltage.

The first transistor may include a plurality of first transistors coupled in parallel to each other between the first power source and the node, and the plurality of first transistors may be turned on or off sequentially when the voltage at the node is outside a range between the first reference voltage and the second reference voltage.

The power converter may further include: a second transistor coupled between the node and a second power source, the second transistor to increase or decrease the current at the node when the second transistor is turned on; a third comparator including an input terminal coupled to the node and an output terminal coupled to a gate electrode of the second transistor, the third comparator to turn on the second transistor in response to comparing the voltage at the node with a third reference voltage; and a fourth comparator including an input terminal coupled to the node and an output terminal coupled to the gate electrode of the second transistor, the fourth comparator to turn off the second transistor in response to comparing the voltage at the node with a fourth reference voltage, wherein, when the first transistor is to increase the current at the node when the first transistor is turned on, the second transistor is to decrease the current at the node when the second transistor is turned on, or when the first transistor is to decrease the current at the node when the first transistor is turned on, the second transistor is to increase the current at the node when the second transistor is turned on.

The second transistor may include a plurality of second transistors coupled in parallel to each other between the second power source and the node, and the plurality of second transistors may be turned on or off sequentially when the voltage at the node is outside a range between the third reference voltage and the fourth reference voltage.

The output voltage may be between the second reference voltage and the fourth reference voltage, the second reference voltage may be greater than the fourth reference voltage, the first reference voltage may be less than the fourth reference voltage, and the third reference voltage may be greater than the second reference voltage.

According to some embodiments of the present invention, a method of operating a power converter includes: comparing a voltage at a node with a first reference voltage and a second reference voltage; increasing a current at the node in response to the voltage at the node being lower than the first reference voltage; and decreasing the current at the node in response to the voltage at the node being greater than the second reference voltage.

The increasing of the current at the node may include controlling a first transistor coupled between a first power source and the node, and the decreasing of the current at the node may include controlling a second transistor coupled between the node and a second power source.

The method may further include: turning on the first transistor to increase the current at the node when the voltage at the node is below a range of the first reference voltage; turning off the first transistor when the voltage at the node is above the range of the first reference voltage; turning on the second transistor to decrease the current at the node when the voltage at the node is above a range of the second reference voltage; and turning off the second transistor when the voltage at the node is below the range of the second reference voltage.

The first transistor may include a plurality of first transistors coupled in parallel to each other between the first power source and the node, and the second transistor may include a plurality of second transistors coupled in parallel to each other between the second power source and the node, and the method may further include: turning the plurality of first transistors on or off sequentially; and turning the plurality of second transistors on or off sequentially.

The first reference voltage may include a first on reference voltage and a first off reference voltage, and the method may further include: turning on the first transistor to increase the current at the node when the voltage at the node is less than the first on reference voltage; and turning off the first transistor when the voltage at the node is greater than the first off reference voltage.

The second reference voltage may include a second on reference voltage and a second off reference voltage, and the method may further include: turning on the second transistor to decrease the current at the node when the voltage at the node is greater than the second on reference voltage; and turning off the second transistor when the voltage at the node is less than the second off reference voltage.

An output voltage output to the node may be between the first off reference voltage and the second off reference voltage, the second off reference voltage may be less than the first off reference voltage, the first on reference voltage may be less than the second off reference voltage, and the second on reference voltage may be greater than the first off reference voltage.

BRIEF DESCRIPTION OF THE DRAWINGS

The above and other aspects and features of the present invention will become apparent to those skilled in the art from the following detailed description of the example embodiments with reference to the accompanying drawings.

DETAILED DESCRIPTION

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey some of the aspects and features of the present invention to those skilled in the art. Accordingly, processes, elements, and techniques that are not necessary to those having ordinary skill in the art for a complete understanding of the aspects and features of the present invention are not described with respect to some of the embodiments of the present invention. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," or "adjacent to" another element or layer, it can be directly on, connected to, coupled to, or adjacent to the other element or layer, or one or more intervening elements or layers may be present. However, when an element or layer is referred to as being "directly on," "directly connected to," "directly coupled to," or "immediately adjacent to" another element or layer, there are no intervening elements or layers present.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
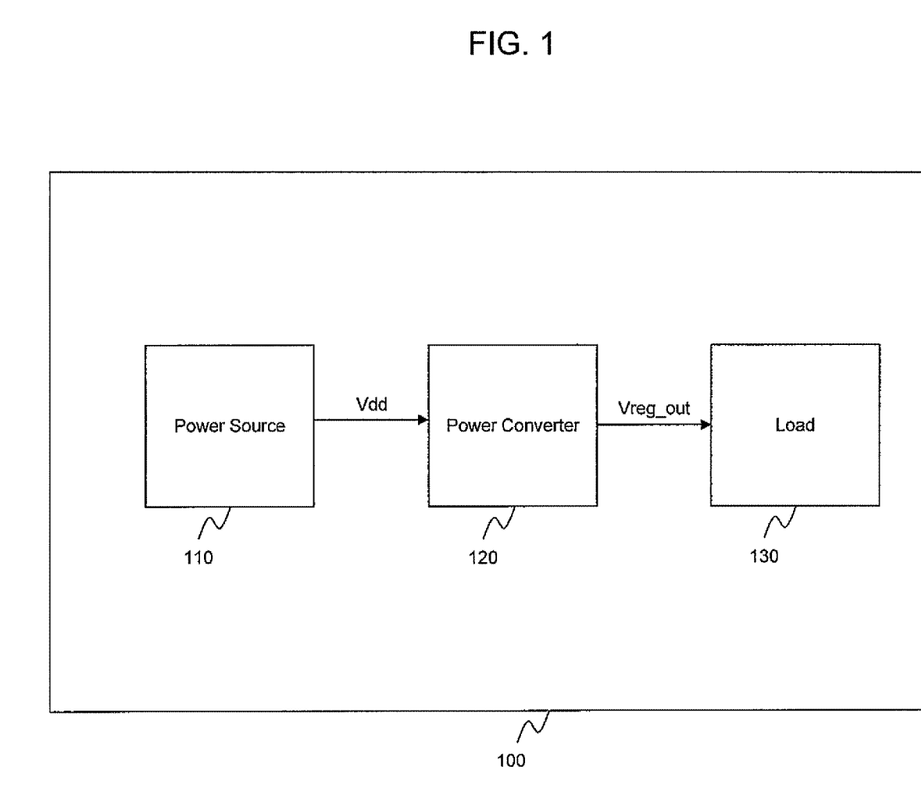
FIG. 1 is a block diagram illustrating an electronic device, according to some embodiments of the present invention.

FIG. 1 is a block diagram illustrating an electronic device, according to some embodiments of the present invention.

Referring to FIG. 1, an electronic device 100 includes a power source 110 (e.g., a DC power source or battery), a power converter 120 coupled to (e.g., connected to) the power source 110, and a load 130 coupled to the power converter 120. The power source 110 supplies power Vdd to the power converter 120. The power converter 120 outputs a voltage at an output terminal Vreg_out to the load 130 coupled to the output terminal Vreg_out.

In embodiments of the present invention, the electronic device 100 may include cellular phones, personal digital assistants (PDAs), laptop computers, tablet computers, etc., but the present invention is not limited thereto, and the electronic device may include any device that utilizes on-chip power conversion or on-chip voltage power regulation.

Figure 2:
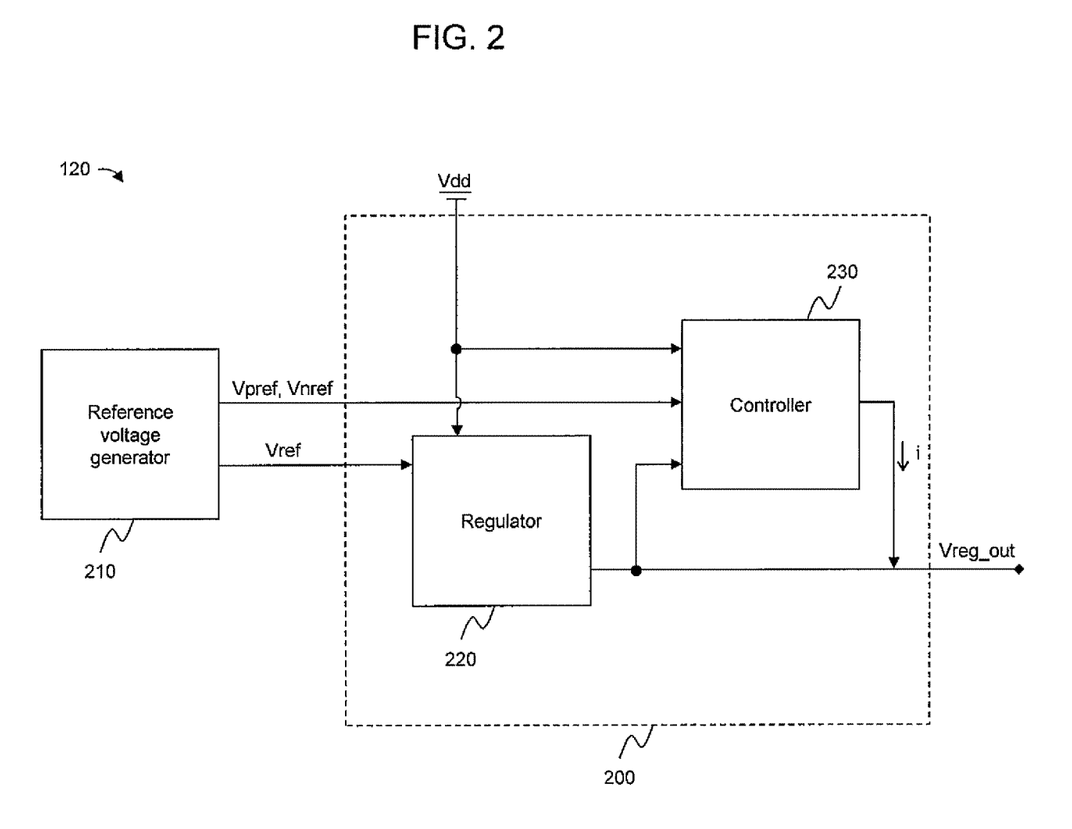
FIG. 2 is a block diagram illustrating a power converter, according to some embodiments of the present invention.

FIG. 2 is a block diagram illustrating further details of a power converter according to some embodiments of the present invention.

Referring to FIG. 2, the power converter 120 includes a DC-DC converter 200 and a reference voltage generator 210. In FIG. 2, the reference voltage generator 210 is shown as a component of the power converter 120, but the present invention is not limited thereto, and the reference voltage generator 210 may be a separate or external component with respect to the power converter 120.

The reference voltage generator 210 generates reference voltages Vref, Vpref, and Vnref, and supplies the reference voltages Vref, Vpref, and Vnref to the DC-DC converter 200. As will be discussed in more detail below, the DC-DC converter receives the power Vdd from a first power source (e.g., the power source 110), and outputs the voltage to the output terminal Vreg_out according to the reference voltages Vref, Vpref, and Vnref.

The DC-DC converter 200 includes a regulator 220 and a controller 230. The regulator 220 regulates the power Vdd according to the reference voltage Vref supplied from the reference voltage generator 210. In some embodiments of the present invention, the regulator 220 may include a low-dropout regulator (LDO), but the present invention is not limited thereto, and the regulator 220 may include any regulator (e.g., linear regulator or switching regulator) that provides desired line and load regulation.

As will be discussed in more detail below, the controller 230 monitors the output of the regulator 220, and controls the amount of current i provided to the load corresponding to the reference voltages Vpref and Vnref, in order to increase or decrease the voltage at the output terminal Vreg_out in response to the load increasing or decreasing. In some embodiments of the present invention, the controller 230 includes a digital controlled regulator with a control mechanism having a voltage hysteresis (e.g., a Schmitt trigger), but the present invention is not limited thereto, and the controller 230 may include, for example, any analog-to-digital converter with a digital processing unit that is controlled through a control mechanism having a voltage hysteresis.

Figure 3:
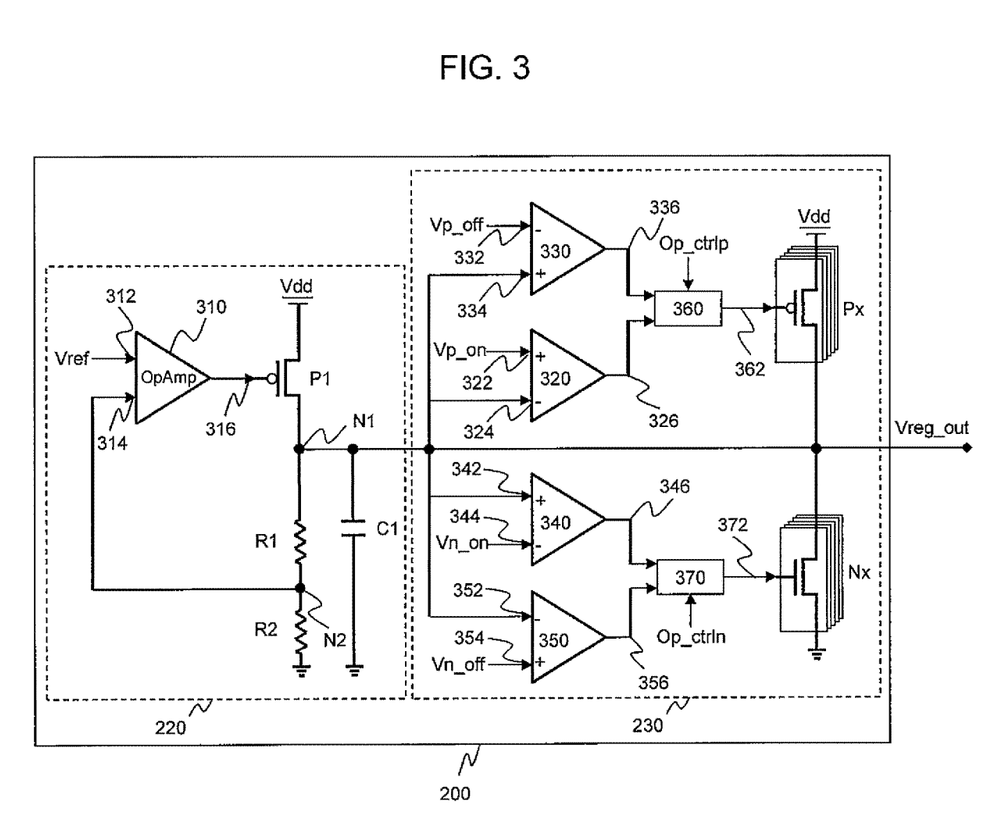
FIG. 3 is a schematic diagram illustrating a DC-DC converter of the power converter shown in FIG. 2, according to some embodiments of the present invention.

FIG. 3 is a schematic diagram illustrating further details of the DC-DC converter shown in FIG. 2 according to some embodiments of the present invention.

Referring to FIG. 3, the DC-DC converter 200 includes the regulator 220 and the controller 230. The regulator 220 monitors the voltage of the output terminal Vreg_out, and provides the line and load regulation according to the reference voltage Vref. In some embodiments, the regulator 220 includes an LDO for providing the line and load regulation. However, the present invention is not limited thereto, and the regulator 220 may include any suitable regulator (e.g., linear regulator or switching regulator) that provides the desired line and load, regulation.

In some embodiments, the regulator 220 includes an operational amplifier (OpAmp) 310, a transistor P1, resistors R1 and R2, and a capacitor C1. The OpAmp 310 includes a first input terminal 312, a second input terminal 314, and an output terminal 316 coupled to a gate electrode of the transistor P1. The transistor P1 is coupled between the first power source for supplying the power Vdd and a first node N1. Here, the transistor P1 is depicted as a PMOS transistor, but the present invention is not limited thereto.

The first node N1 is coupled to the output terminal Vreg_out. The resistor R1 is coupled between the first node N1 and a second node N2. The resistor R2 is coupled between the second node N2 and a second power source (e.g., ground). The capacitor C1 is coupled between the first node N1 and the second power source (e.g., ground).

The resistors R1 and R2 may operate as a voltage divider that produces an output voltage at the node N2 that is a fraction of the voltage at the node N1. The values of the resistors R1 and R2 may be determined by R2/(R1+R2)=Vref/Vreg_out and other design requirements.

The first input terminal 312 of the OpAmp 310 receives the reference voltage Vref, and the second input terminal 314 of the OpAmp 310 is coupled to the second node N2. The second input terminal 314 receives the voltage generated at the second node N2 via the resistors R1 and R2 corresponding to a voltage at the output terminal Vreg_out. The OpAmp 310 detects a differential between the first input terminal 312 and the second input terminal 314, and controls the transistor P1 to provide a voltage to the output terminal Vreg_out.

The controller 230 monitors the voltage of the output terminal Vreg_out, and controls an amount of current supplied to the load according to the reference voltages Vpref and Vnref. As will be discussed in more detail below, the controller 230 increases the current supplied to the load according to the reference voltage Vpref, and decreases the current supplied to the load according to the reference voltage Vnref.

In some embodiments, the controller 230 includes one or more of a plurality of first and second comparators, a plurality of controllers, and a plurality of transistors respectively coupled to the plurality of controllers.

In some embodiments, the plurality of first comparators includes a first comparator 320 and a second comparator 330. The plurality of second comparators includes a third comparator 340 and a fourth comparator 350. The plurality of controllers includes a first controller 360 and a second controller 370. The plurality of transistors includes a plurality of first transistors Px coupled to the first controller 360, and a plurality of second transistors Nx coupled to the second controller 370.

In some embodiments, the reference voltage Vpref includes reference voltages Vp_on and Vp_off, and the reference voltage Vnref includes reference voltages Vn_on and Vn_off. The reference voltages Vp_on, Vp_off, Vn_on, and Vn_off may include predefined (e.g., set or predetermined) threshold voltages for the control mechanisms (e.g., the first and second controllers).

In some embodiments, the first and second comparators 320 and 330 may be coupled (e.g., connected) between the output terminal Vreg_out (e.g., the first node N1) and the first controller 360. A first input terminal 322 (e.g., non-inverting input terminal) of the first comparator 320 is configured to receive the reference voltage Vp_on. A second input terminal 324 (e.g., inverting input terminal) of the first comparator 320 is coupled to the output terminal Vreg_out. An output terminal of the first comparator 320 is coupled to a first input terminal 326 of the first controller 360.

A first input terminal 332 (e.g., inverting input terminal) of the second comparator 330 is configured to receive the reference voltage Vp_off. A second input terminal 334 (e.g., non-inverting input terminal) of the second comparator 330 is coupled to the output terminal Vreg_out. An output terminal of the second comparator 330 is coupled to a second input terminal 336 of the first controller 360.

In some embodiments, the third comparator 340 and the fourth comparator 350 are coupled (e.g., connected) between the output terminal Vreg_out (e.g., the first node N1) and the second controller 370. A first input terminal 342 (e.g., non-inverting input terminal) of the third comparator 340 is coupled to the output terminal Vreg_out. A second input terminal 344 (e.g., inverting input terminal) of the third comparator 340 is configured to receive the reference voltage Vn_on. An output terminal of the third comparator 340 is coupled to a first input terminal 346 of the second controller 370.

A first input terminal 352 (e.g., inverting input terminal) of the fourth comparator 350 is coupled to the output terminal Vreg_out. A second input terminal 354 (e.g., non-inverting input terminal) of the fourth comparator 350 is configured to receive the reference voltage Vn_off. An output terminal of the fourth comparator 350 is coupled to a second input terminal 356 of the second controller 370.

As shown in FIG. 3, in some embodiments, each of the first and second transistors Px and Nx includes x number of transistors, where x is an integer greater than or equal to 1, that are respectively coupled in parallel to each other.

Each of the first transistors Px is coupled between the first power source for supplying the power Vdd and the output terminal Vreg_out. Gate electrodes of the first transistors Px are coupled to an output terminal 362 of the first controller 360.

Each of the second transistors Nx is coupled between the output terminal Vreg_out and the second power source (e.g., ground). Gates electrodes of the second transistors Nx are coupled to an output terminal 372 of the second controller 370.

The first and second transistors Px and Nx are respectively controlled (e.g., switched on and off) by the first and second controllers 360 and 370. The controllers 360 and 370 may include any suitable controllers, for example, microcontrollers, microprocessors, and/or may be implemented using FPGAs, software, firmware, hardware, or any other suitable devices or methods known to those skilled in the art. When the first transistors Px are turned on, the current supplied to the load is increased. When the second transistors Nx are turned on, the current supplied to the load is decreased. In FIG. 3, the first transistors Px are depicted as PMOS transistors and the second transistors Nx are depicted as NMOS transistors, but the present invention is not limited thereto.

Accordingly, as will be discussed in more detail below, the controller 230 increases the current provided to the output terminal Vreg_out by controlling the first transistors Px according to the reference voltage Vpref, and decreases the current provided to the output terminal Vreg_out by controlling the second transistors Nx according to the reference voltage Vnref.

Hereinafter, the operation of the DC-DC converter 200 will be described in more detail with reference to FIGS. 3, 4A, and 4B.

Figure 4A:
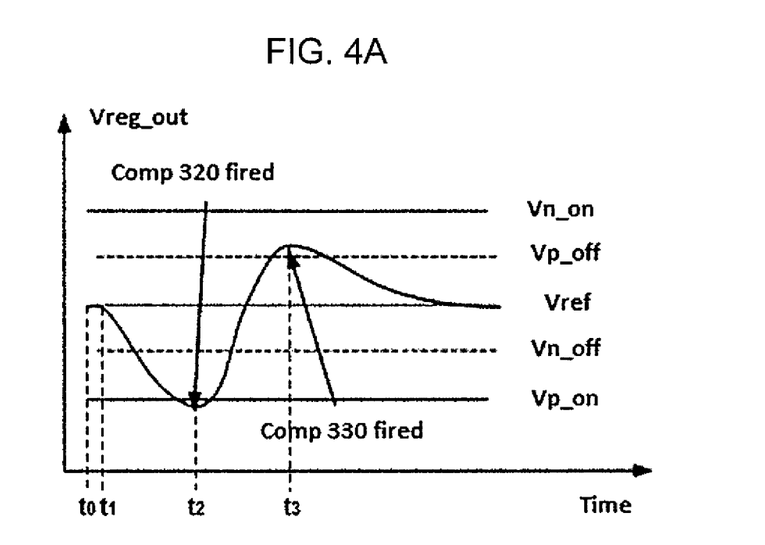
FIGS. 4A and 4B are graphs illustrating the operation of the DC-DC converter shown in FIG. 3, according to some embodiments of the present invention.
Figure 4B:
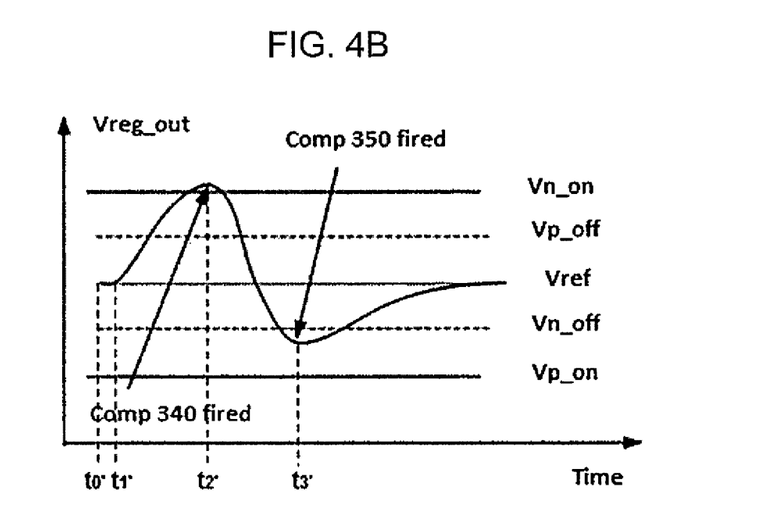

FIGS. 4A and 4B are graphs illustrating the operation of the DC-DC converter 200 shown in FIG. 3 according to some embodiments of the present invention. FIGS. 4A and 4B illustrate the relationship between the reference voltages Vref, Vp_on, Vp_off, Vn_on, and Vn_off and the voltage at the output terminal Vreg_out.

Referring to FIGS. 3, 4A, and 4B, the regulator 220 supplies the line and load regulation for the output terminal Vreg_out according to the reference voltage Vref, when there is limited load changes during a normal mode operation. During the normal mode operation, the controller 230 is off (e.g., in a standby state). For example, as shown in FIGS. 4A and 4B, the regulator 220 regulates the voltage at the output terminal Vreg_out to be around (e.g., about equal to) the reference voltage Vref at times $t_0$ and $t_{0'}$.

FIG. 4A shows an example operation of the DC-DC converter 200 in response to a load increasing. As shown in FIG. 4A, the load is suddenly increased at time $t_1$. The load may be increased, for example, when the electronic device is awakened from sleep mode or stand-by mode. When the load is increased, the voltage at the output terminal Vreg_out decreases between time $t_1$ and time $t_2$ due to the increased load. At time $t_2$, in response to the voltage at the output terminal Vreg_out decreasing below the reference voltage Vp_on, the first comparator 320 is triggered. The first comparator 320 compares the voltage at the output terminal Vreg_out with the reference voltage Vp_on, and provides a signal to the first controller 360 to turn on one or more of the first transistors Px when the voltage at the output terminal Vreg_out is lower than the reference voltage Vp_on. The first controller 360 turns on the first transistors Px (e.g., sequentially or one-by-one) according to the signal provided by the first comparator 320.

When the first transistors Px are turned on, the current provided to the load increases, and thus, the voltage at the output terminal Vreg_out increases. At time $t_3$, in response to the voltage at the output terminal Vreg_out increasing above the reference voltage Vp_off, the second comparator 330 is triggered. The second comparator 330 compares the voltage at the output terminal Vreg_out with the reference voltage Vp_off, and provides a signal to the first controller 360 to turn off at least one of the first transistors Px when the voltage at the output terminal Vreg_out is greater than the reference voltage Vp_off. The first controller 360 turns off the first transistors Px (e.g., sequentially or one-by-one) according to the signal provided by the second comparator 330.

FIG. 4B shows an example operation of the DC-DC converter 200 in response to a load decreasing. As shown in FIG. 4B, the load is suddenly decreased at time $t_1$. The load may be decreased, for example, when the electronic device enters sleep mode or stand-by mode. When the load is decreased, the voltage at the output terminal Vreg_out increases between time $t_1$ and time $t_{2'}$ due to the decreased load. At time $t_{2'}$, in response to the voltage at the output terminal Vreg_out increasing above the reference voltage Vn_on, the third comparator 340 is triggered. The third comparator 340 compares the voltage at the output terminal Vreg_out with the reference voltage Vn_on, and provides a signal to the second controller 370 to turn on one or more of the second transistors Nx when the voltage at the output terminal Vreg_out is greater than the reference voltage Vn_on. The second controller 370 turns on the second transistors Nx (e.g., sequentially or one-by-one) according to the signal provided by the third comparator 340.

When the second transistors Nx are turned on, the current provided to the load decreases by providing a drain path for the current, and thus, the voltage at the output terminal Vreg_out decreases. At time $t_{3'}$, in response to the voltage at the output terminal Vreg_out decreasing below the reference voltage Vn_off, the fourth comparator 350 is triggered. The fourth comparator 350 compares the voltage at the output terminal Vreg_out with the reference voltage Vn_off, and provides a signal to the second controller 370 to turn off one or more of the second transistors Nx when the voltage at the output terminal Vreg_out is lower than the reference voltage Vn_off. The second controller 370 turns off the second transistors Nx (e.g., sequentially or one-by-one) according to the signal provided by the fourth comparator 350.

In the example embodiments shown in FIGS. 4A and 4B, Vp_on is less than Vref, Vp_off is greater than Vp_on, Vn_on is greater than Vref, and Vn_off is less than Vn_on. Further, according to some embodiments, to avoid the first transistors Px from being turned on concurrently (e.g., simultaneously) with the second transistors Nx, the voltage difference between Vp_on and Vn_off may be larger than their respective comparator's offset (e.g., error) with margin, and the voltage difference between Vn_on and Vp_off should be larger than their respective comparators offset (e.g., error) with margin. For example, if the comparator's offset is 5 mv, then the voltage difference between Vp_on and Vn_off may be larger than 5 mv with the margin (e.g., 10 mv).

Figure 5:
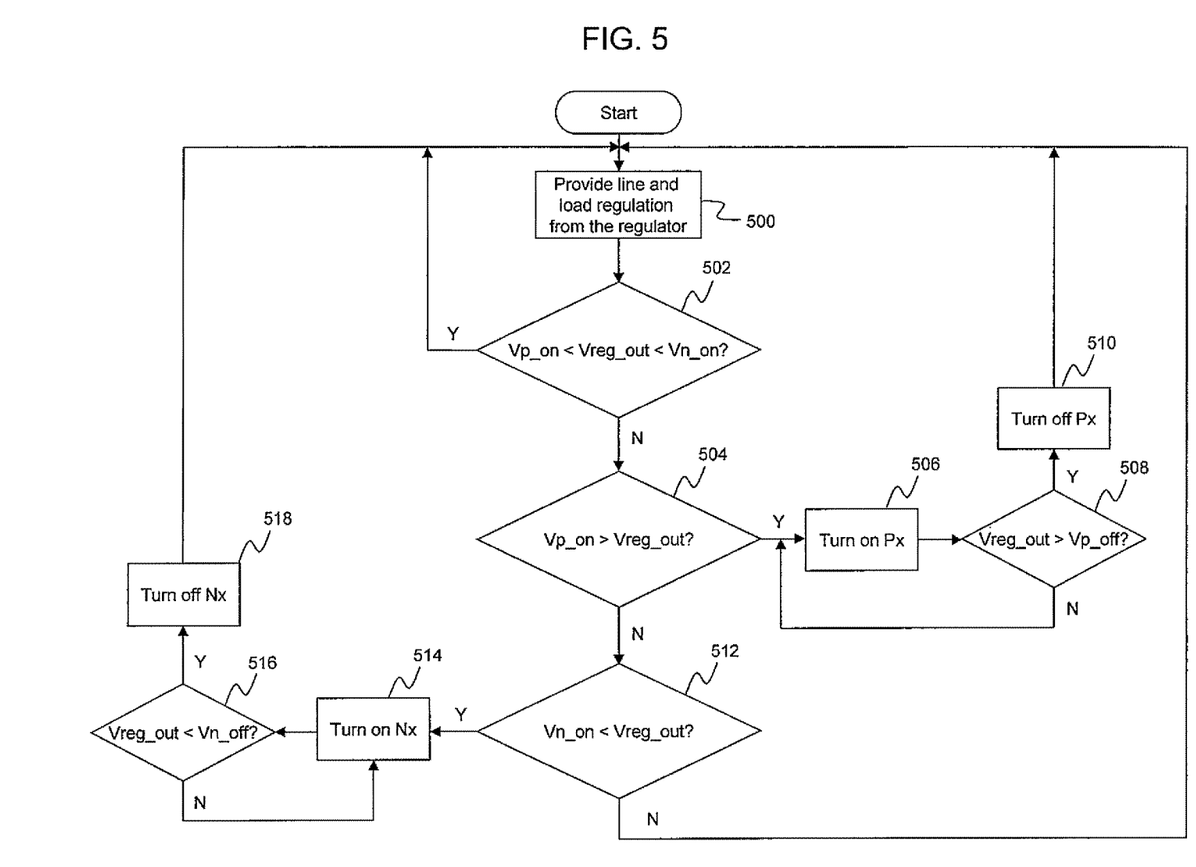
FIG. 5 is a flow diagram of a method of operating the power converter shown in FIG. 3, according to some embodiments of the present invention.

FIG. 5 is a flow diagram of a method of operating the power converter shown in FIG. 3 according to some embodiments of the present invention. However, the present invention is not limited to the sequence or number of the operations of the method shown in FIG. 5, and can be altered into any desired sequence or number of operations as recognized by a person of ordinary skill in the art. For example, in some embodiments, the order may vary, or the method may include fewer or additional operations.

Referring to FIGS. 3 through 5, the process starts, and at block 500, the power converter of an electronic device provides line and load regulation to a load coupled to an output terminal Vreg_out of the power converter. At block 502, the power converter determines whether or not the voltage at the output terminal Vreg_out is greater than the reference voltage Vp_on, but less than the reference voltage Vn_on (e.g., during a normal mode). If the voltage at the output terminal Vreg_out is greater than the reference voltage Vp_on, but less than the reference voltage Vn_on, the process may return to block 500 to provide line and load regulation by the regulator (e.g., LDO). If not, the process may proceed to blocks 504 and/or 512.

In response to the power converter detecting that the voltage at the output terminal Vreg_on is less than the reference voltage Vp_on at block 504, the first comparator 320 may be triggered to turn on the first transistors Px (e.g., sequentially or one-by-one) at block 506. When the first transistors Px are turned on, the current supplied to the load is increased.

The first transistors Px remain on until the power converter detects, at block 508, that the voltage at the output terminal Vreg_out is greater than the reference voltage Vp_off. In response to the power converter detecting that the voltage at the output terminal Vreg_out is greater than the reference voltage Vp_off at block 508, the second comparator 330 may be triggered to turn off the first transistors Px (e.g., sequentially or one-by-one) at block 510. When the first transistors Px are turned off, the process may return to block 500 so that the voltage output to the output terminal Vreg_out may be supplied by only the regulator.

In response to the power converter detecting that the voltage at the output Vreg_out is greater than the reference voltage Vn_on (e.g., the load is suddenly decreased) at block 512, the third comparator 340 may be triggered to turn on the second transistors Nx (e.g., sequentially or one-by-one) at block 514. When the second transistors Nx are turned on, the current supplied to the load is decreased by providing a drain path for the current at the output terminal Vreg_out.

The second transistors Nx remain on until the power converter detects, at block 516, that the voltage at the output terminal Vreg_out is lower than the reference voltage Vn_off. In response to the power converter detecting that the voltage at the output terminal Vreg_out is less than the reference voltage Vn_off at block 516, the fourth comparator 350 may be triggered to turn off the second transistors Nx (e.g., sequentially or one-by-one) at block 518. When the second transistors Nx are turned off, the process may return to block 500 so that the voltage output to the output terminal Vreg_out may be supplied by only the regulator.

FIG. 5 shows that block 504 is performed before block 512. However, the present invention is not limited thereto, and block 512 may be performed before block 504, or blocks 504 and 512 may be performed concurrently (e.g., simultaneously).

Accordingly, in some embodiments of the present invention, the power converter of an electronic device may provide desired line and load regulation when there are limited load changes, and fast response speeds when there are sudden load changes.

Although the present invention has been described with reference to the example embodiments, those skilled in the art will recognize that various changes and modifications to the described embodiments may be performed, all without departing from the spirit and scope of the present invention. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims and their equivalents.

What is claimed is:

1. A power converter comprising:
    a regulator to generate an output voltage for powering a load and to provide line and load regulation of the output voltage, the regulator comprising an output terminal to output the output voltage according to a first reference voltage, the output terminal to be coupled to the load;
    a controller coupled to the output terminal, the controller to increase a current at the output terminal when a voltage at the output terminal is lower than a second reference voltage, and to decrease the current at the output terminal when the voltage at the output terminal is greater than a third reference voltage,
    wherein the controller comprises:
        a voltage increasing controller, wherein the voltage increasing controller is in a first standby state during a normal mode operation;
        a voltage decreasing controller, wherein the voltage decreasing controller is in a second standby state during the normal mode operation; and
        a plurality of comparators coupled to the voltage increasing controller and the voltage decreasing controller, wherein the plurality of comparators are configured to directly compare the output voltage with the second reference voltage and the third reference voltage to increase or decrease the current at the output terminal by leaving the normal mode operation by activating the voltage increasing controller from the first standby state to increase the output voltage when the voltage at the output terminal is lower than the second reference voltage or by activating the voltage decreasing controller from the second standby state to decrease the output voltage when the voltage at the output terminal is greater than the third reference voltage.

2. The power converter of claim 1, wherein the controller comprises:
    a first transistor to increase the current at the output terminal when the first transistor is turned on;
    a plurality of first comparators from among the comparators to control the first transistor according to the second reference voltage;
    a second transistor to decrease the current at the output terminal when the second transistor is turned on; and
    a plurality of second comparators from among the comparators to control the second transistor according to the third reference voltage.

3. The power converter of claim 2, wherein the plurality of first comparators comprises a first comparator to turn on the first transistor and a second comparator to turn off the first transistor, and
    wherein the plurality of second comparators comprises a third comparator to turn on the second transistor and a fourth comparator to turn off the second transistor.

4. The power converter of claim 3, wherein:
    the first transistor comprises a plurality of first transistors coupled in parallel to each other between a first power source and the output terminal; and
    the second transistor comprises a plurality of second transistors coupled in parallel to each other between the output terminal and a second power source.

5. The power converter of claim 4, wherein the plurality of the first transistors are to be turned on or off sequentially, and the plurality of the second transistors are to be turned on or off sequentially.

6. The power converter of claim 2, wherein:
    the second reference voltage comprises a second on reference voltage and a second off reference voltage;
    the third reference voltage comprises a third on reference voltage and a third off reference voltage;
    the first transistor is to be turned on when the voltage at the output terminal is less than the second on reference voltage;
    the first transistor is to be turned off when the voltage at the output terminal is greater than the second off reference voltage;
    the second transistor is to be turned on when the voltage at the output terminal is greater than the third on reference voltage; and
    the second transistor is to be turned off when the voltage at the output terminal is less than the third off reference voltage.

7. The power converter of claim 6, wherein the first reference voltage is between the second off reference voltage and the third off reference voltage, the second on reference voltage is less than the first reference voltage, the second off reference voltage is greater than the second on reference voltage, the third on reference voltage is greater than the first reference voltage, and the third off reference voltage is less than the third on reference voltage.

8. The power converter of claim 1, further comprising:
    a first plurality of transistors coupled to the voltage increasing controller,
    wherein the first plurality of transistors are configured to be controlled one by one by the voltage increasing controller based on the difference between the output voltage and the second reference voltage; and
        a second plurality of transistors coupled to the voltage decreasing controller, wherein the second plurality of transistors are configured to be controlled one by one by the voltage decreasing controller based on the difference between the output voltage and the third reference voltage.

9. A power converter comprising:
a regulator to generate an output voltage for powering a load, and to provide line and load regulation of the output voltage to output the output voltage to a node;
a first transistor coupled between the node and a first power source, the first transistor to increase or decrease a current at the node when the first transistor is turned on;
a voltage increasing controller having a first input terminal, a second input terminal, and a first output terminal, wherein the voltage increasing controller is in a first standby state during a normal mode operation;
a voltage decreasing controller having a third input terminal, a fourth input terminal, and a second output terminal, wherein the voltage decreasing controller is in a second standby state during the normal mode operation;
a first comparator comprising an input terminal coupled to the node and an output terminal coupled to the first input terminal of the voltage increasing controller, wherein the output terminal of the voltage increasing controller is coupled to a gate electrode of the first transistor, the first comparator to leave the normal mode operation by activating the voltage increasing controller from the first standby state to increase the output voltage in response to directly comparing the output voltage at the node with a first reference voltage; and
a second comparator comprising an input terminal coupled to the node and an output terminal coupled to the second input terminal of the voltage increasing controller, wherein the output terminal of the voltage increasing controller is coupled to the gate electrode of the first transistor, the second comparator to turn off the voltage increasing controller into the first standby state in response to directly comparing the output voltage at the node with a second reference voltage.

10. The power converter of claim 9, wherein the first transistor comprises a plurality of first transistors coupled in parallel to each other between the first power source and the node, and the plurality of first transistors are to be turned on or off sequentially when the voltage at the node is outside a range between the first reference voltage and the second reference voltage.

11. The power converter of claim 9, further comprising:
a second transistor coupled between the node and a second power source, the second transistor to decrease the current at the node when the second transistor is turned on;
a third comparator comprising an input terminal coupled to the node and an output terminal coupled to the first input terminal of the voltage decreasing controller, wherein the output terminal of the voltage decreasing controller is coupled to a gate electrode of the second transistor, the third comparator to leave the normal mode operation by activating the voltage decreasing controller from the second standby state to increase the output voltage in response to comparing the voltage at the node with a third reference voltage; and
a fourth comparator comprising an input terminal coupled to the node and an output terminal coupled to the second input terminal of the voltage decreasing controller, wherein the output terminal of the voltage decreasing controller is coupled to the gate electrode of the second transistor, the fourth comparator to turn off the voltage decreasing controller into the second standby state in response to comparing the voltage at the node with a fourth reference voltage,
wherein, when the first transistor is to increase the current at the node when the first transistor is turned on, the second transistor is to decrease the current at the node when the second transistor is turned on, or
when the first transistor is to decrease the current at the node when the first transistor is turned on, the second transistor is to increase the current at the node when the second transistor is turned on.

12. The power converter of claim 11, wherein the second transistor comprises a plurality of second transistors coupled in parallel to each other between the second power source and the node, and the plurality of second transistors are to be turned on or off sequentially when the voltage at the node is outside a range between the third reference voltage and the fourth reference voltage.

13. The power converter of claim 11, wherein the output voltage is between the second reference voltage and the fourth reference voltage, the second reference voltage is greater than the fourth reference voltage, the first reference voltage is less than the fourth reference voltage, and the third reference voltage is greater than the second reference voltage.

14. A method of operating a power converter comprising:
providing, by a regulator, line and load regulation to a voltage for powering a load;
directly comparing, by a first plurality of comparators, the voltage for powering the load at a node with a first reference voltage;
leaving, by the first plurality of comparators, a normal mode operation by activating a voltage increasing controller from a first standby state in response to the voltage at the node being lower than the first reference voltage;
increasing, by the voltage increasing controller, a current at the node in response to the voltage at the node being lower than the first reference voltage;
directly comparing, by a second plurality of comparators, the voltage for powering the load at a node with a second reference voltage;
leaving, by the second plurality of comparators, the normal mode operation by activating a voltage decreasing controller from a second standby state in response to the voltage at the node being greater than the second reference voltage; and
decreasing, by the voltage decreasing controller, the current at the node in response to the voltage at the node being greater than the second reference voltage.

15. The method of claim 14, wherein the increasing of the current at the node comprises controlling a first transistor coupled between a first power source and the node, and
wherein the decreasing of the current at the node comprises controlling a second transistor coupled between the node and a second power source.

16. The method of claim 15, further comprising:
turning on the first transistor to increase the current at the node when the voltage at the node is below a range of the first reference voltage;
turning off the first transistor when the voltage at the node is above the range of the first reference voltage;
turning on the second transistor to decrease the current at the node when the voltage at the node is above a range of the second reference voltage; and
turning off the second transistor when the voltage at the node is below the range of the second reference voltage.

17. The method of claim 16, wherein the first transistor comprises a plurality of first transistors coupled in parallel to each other between the first power source and the node, and the second transistor comprises a plurality of second transistors coupled in parallel to each other between the second power source and the node, the method further comprising:
  turning the plurality of first transistors on or off sequentially; and
  turning the plurality of second transistors on or off sequentially.

18. The method of claim 16, wherein the first reference voltage comprises a first on reference voltage and a first off reference voltage, the method further comprising:
  turning on the first transistor to increase the current at the node when the voltage at the node is less than the first on reference voltage; and
  turning off the first transistor when the voltage at the node is greater than the first off reference voltage.

19. The method of claim 18, wherein the second reference voltage comprises a second on reference voltage and a second off reference voltage, the method further comprising:
  turning on the second transistor to decrease the current at the node when the voltage at the node is greater than the second on reference voltage; and
  turning off the second transistor when the voltage at the node is less than the second off reference voltage.

20. The method of claim 19, wherein an output voltage output to the node is between the first off reference voltage and the second off reference voltage, the second off reference voltage is less than the first off reference voltage, the first on reference voltage is less than the second off reference voltage, and the second on reference voltage is greater than the first off reference voltage.

21. A power converter comprising:
  a regulator to generate an output voltage for powering a load and to provide line and load regulation of the output voltage, the regulator comprising an output terminal to output the output voltage according to a first reference voltage, the output terminal to be coupled to the load;
  a voltage increasing controller coupled to the output terminal, wherein the voltage increasing controller is in a first standby state during a normal mode operation and is activated from the first standby state to increase the output voltage by increasing a current at the output terminal in response to the output voltage being lower than a second reference voltage; and
  a voltage decreasing controller coupled to the output terminal, wherein the voltage decreasing controller is in a second standby state during the normal mode operation and is activated from the second standby state to decrease the output voltage by decreasing the current at the output terminal in response to the voltage being greater than a third reference voltage.

* * * * *